(12) United States Patent
Flynn

(10) Patent No.: US 9,525,319 B2
(45) Date of Patent: Dec. 20, 2016

(54) HIGH FORCE ROTARY ACTUATOR

(71) Applicant: Charles J. Flynn, Greenwood, MO (US)

(72) Inventor: Charles J. Flynn, Greenwood, MO (US)

(73) Assignee: QM Power, Inc., Lee's Summit, MO (US)

( * ) Notice: Subject to any disclaimer, the term of this patent is extended or adjusted under 35 U.S.C. 154(b) by 313 days.

(21) Appl. No.: 14/450,770

(22) Filed: Aug. 4, 2014

(65) Prior Publication Data

US 2014/0339927 A1 Nov. 20, 2014

Related U.S. Application Data

(63) Continuation of application No. 13/086,650, filed on Apr. 14, 2011, now Pat. No. 8,810,084.

(60) Provisional application No. 61/325,259, filed on Apr. 16, 2010.

(51) Int. Cl.
| | |
|---|---|
| *H02K 19/06* | (2006.01) |
| *H02K 7/06* | (2006.01) |
| *H01F 7/122* | (2006.01) |
| *H01F 7/14* | (2006.01) |
| *H02K 41/06* | (2006.01) |
| *H02K 33/12* | (2006.01) |

(52) U.S. Cl.
CPC ............... *H02K 7/06* (2013.01); *H01F 7/122* (2013.01); *H01F 7/145* (2013.01); *H02K 33/12* (2013.01); *H02K 41/06* (2013.01)

(58) Field of Classification Search
CPC .......... H01F 7/122; H01F 7/145; H02K 41/06; H02K 7/06; H02K 7/065; H02K 7/10; H02K 19/06; H02K 33/00; H02K 33/12; H02K 41/03; H02K 21/04; H02K 21/00; H02K 21/44
See application file for complete search history.

(56) References Cited

U.S. PATENT DOCUMENTS

| | | | | |
|---|---|---|---|---|
| 4,514,674 A * | 4/1985 | Hollis, Jr. | ................. | B23Q 1/36 318/135 |
| 4,945,269 A * | 7/1990 | Kamm | .................... | H02K 33/00 310/12.21 |
| 5,896,076 A * | 4/1999 | van Namen | .......... | H01F 7/1615 335/222 |
| 6,051,904 A * | 4/2000 | Akemakou | ............ | H02K 21/44 310/168 |
| 6,246,561 B1 * | 6/2001 | Flynn | ....................... | H02K 1/12 361/147 |
| 6,342,746 B1 * | 1/2002 | Flynn | ....................... | H02K 1/12 310/181 |
| 6,507,257 B2 * | 1/2003 | Mohler | .................. | H02K 26/00 310/36 |

(Continued)

*Primary Examiner* — Tran Nguyen
(74) *Attorney, Agent, or Firm* — James M. Stipek; Polsinelli PC

(57) ABSTRACT

An actuator includes a first stator with four first poles and a second stator with four second poles aligned with the four first poles. A permanent magnet is attached to the first stator and the second stator. Four moving armatures are positioned at terminal ends of the four first poles and the four second poles. Coils are wrapped around the first stator and the second stator. A controller selectively applies current to the coils to migrate flux created by the permanent magnet through selective poles of the first stator and the second stator and thereby alter the size of air gaps associated with the four moving armatures.

16 Claims, 7 Drawing Sheets

(56) References Cited

U.S. PATENT DOCUMENTS

| | | | | |
|---|---|---|---|---|
| 6,956,453 B2 * | 10/2005 | Osterberg | ............. | G02B 7/005 |
| | | | | 310/32 |
| 8,810,084 B2 * | 8/2014 | Flynn | ..................... | H01F 7/122 |
| | | | | 310/12.14 |
| 2006/0071561 A1 * | 4/2006 | Chiu | ..................... | H02K 7/075 |
| | | | | 310/20 |

* cited by examiner

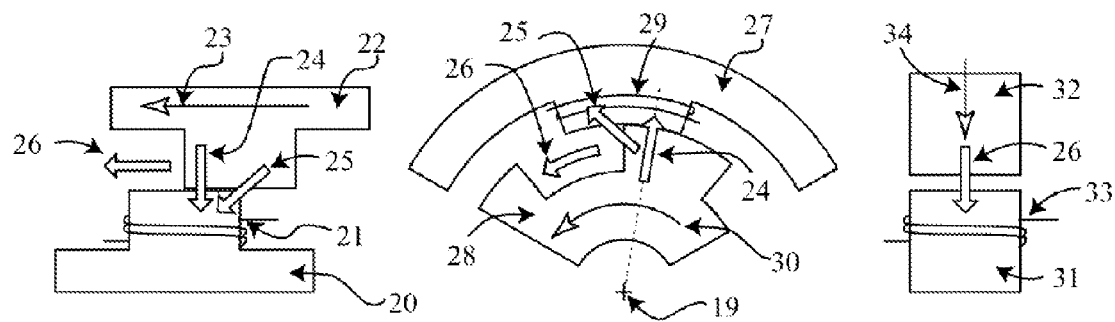
Figure 1A
(Prior Art)
Figure 1B
(Prior Art)
Figure 1C
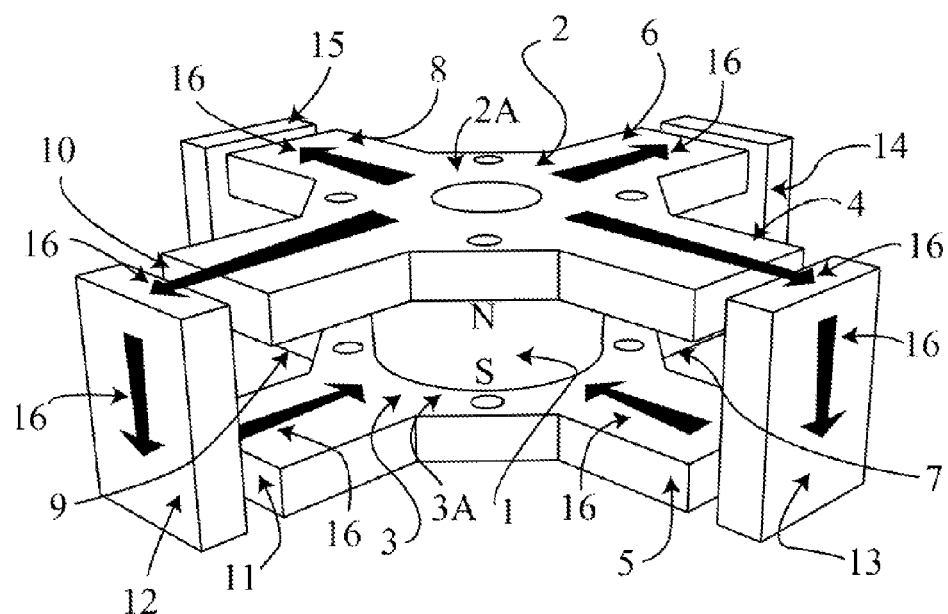
Figure 2

HIGH FORCE ROTARY ACTUATOR

CROSS-REFERENCE TO RELATED APPLICATION

This application is a continuation of U.S. patent application Ser. No. 13/086,650, filed Apr. 14, 2011, entitled High Force Rotary Actuator, which claims priority to U.S. Provisional Patent Application No. 61/325,259, filed Apr. 16, 2010, the entire contents of all of which are incorporated herein by reference.

FIELD OF THE INVENTION

This invention relates generally to devices to create motive forces. More particularly, this invention relates to a high force rotary actuator.

BACKGROUND OF THE INVENTION

Most applications requiring high forces, such as robotic arms and lifts, use hydraulic actuators to develop the required force to move a payload. A hydraulic actuator system requires a gas or electric motor driven pump, a reservoir, fluid lines and control valves operated either by hand or a microprocessor. It would be desirable to replace the hydraulic actuators and the ancillary components required to operate them in these applications with lightweight, high force electro-mechanical actuators.

Hydraulic actuators provide a mechanical advantage not unlike a gearbox or a transmission. With hydraulic pump and actuator systems the force multiplication or mechanical advantage is simply the ratio of the area of the pump piston(s) to the area of the actuator piston. A hydraulic actuator is synonymous with a simple motor and gearbox since each produces a mechanical advantage. Therefore, electric motor gearbox systems have been used to attempt to replace hydraulic actuators. Although high forces can be produced using an electric motor and gearbox this comes at a sacrifice in output speed, which is proportional to the gearing ratio. The solution for increasing the response time is not simply a matter of speeding up the motor feeding the gearbox since the torque the motor produces typically reduces as speed is increased. Therefore, to increase response time the motor must not only run at a higher speed, but must also increase in size. This increase in size not only adds to system weight, but typically exceeds the allowable footprint area for the actuator system.

Most linear and rotary actuators have an angular displacement as stator and armature poles come into and out of alignment. This angular displacement results in forces acting upon two axes. One axis represents the force acting in the direction of the motion and the other axis represents the attractive force that attempts to pull the moving pole and the stationary pole together, which is perpendicular to the direction of motion. The useable force to perform work is the vector sum of these forces. It would be desirable to provide techniques for improved utilization of axial forces.

SUMMARY OF THE INVENTION

In one aspect, the disclosure is directed to a method comprising, in an actuator with (i) coils wrapped around a first plurality of poles defining a first linear axis of a first stator and a second linear axis of the first stator orthogonal to the first linear axis, (ii) coils wrapped around a second plurality of poles of a second stator, the second plurality of poles forming aligned poles with the first plurality of poles including first linear axis aligned poles and second linear axis aligned poles, (iii) a permanent magnet attached to the first stator and the second stator, and (iv) a plurality of moving armatures separated from the aligned poles by a corresponding plurality of air gaps: selectively applying current to the coils to control a size of a first air gap between a first moving armature and a first end of the first linear axis aligned poles to form a first linear motion and to control a second size of a second air gap between a second moving armature and a first end of the second linear axis aligned poles to form a second linear motion. The method further includes receiving output forces of the first linear motion and the second linear motion at a shaft and translating the output forces to rotary motion of the shaft.

In another aspect, the disclosure is directed to a method comprising, in an actuator with coils wrapped around four first poles of a first stator and four second poles of a second stator aligned with the four first poles, a permanent magnet attached to the first stator and the second stator, and four moving armatures positioned at terminal ends of the four first poles and the four second poles: selectively applying current to the coils to migrate flux created by the permanent magnet through selective poles of the first stator and the second stator to selectively alter gap sizes associated with the four moving armatures.

In another aspect, the disclosure is directed to a method comprising selectively applying current to first coils wrapped around a first plurality of poles defining a first linear axis of a first stator and a second linear axis of the first stator orthogonal to the first linear axis and second coils wrapped around a second plurality of poles of a second stator, the second plurality of poles forming aligned poles with the first plurality of poles including first linear axis aligned poles and second linear axis aligned poles, to (i) control a size of a first air gap between a first moving armature and a first end of the first linear axis aligned poles to form a first linear motion and (ii) control a second size of a second air gap between a second moving armature and a first end of the second linear axis aligned poles to form a second linear motion. Output forces of the first linear motion and the second linear motion are received at a shaft and translated to rotary motion of the shaft.

In another aspect, the disclosure is directed to a method comprising selectively applying current to coils wrapped around four first poles of a first stator and four second poles of a second stator aligned with the four first poles to migrate flux created by a permanent magnet through selective poles of the first stator and the second stator to selectively alter gap sizes associated with four moving armatures positioned at terminal ends of the four first poles and the four second poles.

BRIEF DESCRIPTION OF THE FIGURES

The invention is more fully appreciated in connection with the following detailed description taken in conjunction with the accompanying drawings, in which:

FIGS. 1A and 1B illustrate prior art rotary and linear actuator force vectors; FIG. 1C illustrates a force vector formed in accordance with an embodiment of the invention.

FIG. 2 shows a permanent magnet with its flux divided through four poles located on upper and lower stators and through related armatures;

Like reference numerals refer to corresponding parts throughout the several views of the drawings.

DETAILED DESCRIPTION OF THE INVENTION

Figures 3, 4:
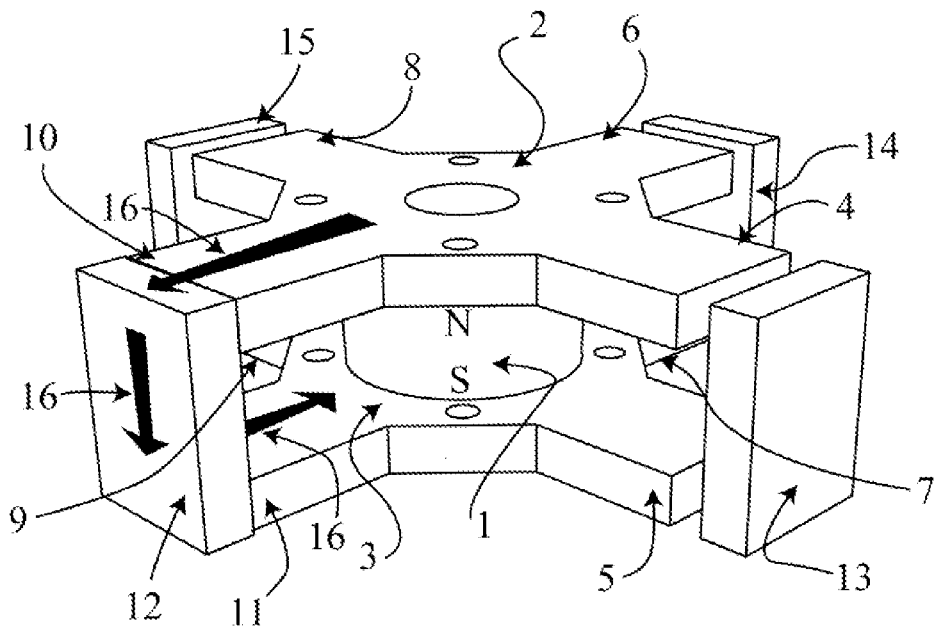
FIG. 3 shows how the permanent magnets flux division/multiplication is affected by the air gap between the stator poles and their respective armatures.
FIGS. 4 and 5 show that using more than one permanent magnet in embodiments of the invention still results in physical and mathematical behavior of a single permanent magnet.

FIG. 1A shows a stator pole 20 for a conventional linear actuator. The stator pole 20 is composed from a magnetically soft material. A coil 21 is wrapped around the stator pole 20. The coil 21 is energized to magnetically attract the moving armature's pole 22, which is also composed from a magnetically soft material. The forces from the magnetic attraction have two main directions: one force 24 is perpendicular to the direction of motion 23 and the second main force 25 acts at an angular displacement to the direction of motion 23. The vector sum of the forces 24 and 25 forms a resultant or net force 26 acting in the direction of the motion 23, which will always be less than the sum of the forces 24 and 25. As the moving armature pole 22 moves into alignment with the stator pole 20, the force acting perpendicular to the direction of motion 24 becomes the dominant force, which reduces the net force 26.

FIG. 1B shows a stator pole 27 for a conventional rotary actuator composed from a magnetically soft material. A coil 29 is wrapped around the stator pole 27. The coil 29 is energized to magnetically attract the moving rotor pole 28, which is also composed from a magnetically soft material. The forces from the magnetic attraction have two main directions: one force 24 is perpendicular to the direction of motion 30 and the second main force 25 acts at an angular displacement to the direction of motion 30. The vector sum of the forces 24 and 25 forms a resultant or net force 26 acting in the direction of the motion 23. This net force is always less than the sum of the forces 24 and 25. As the moving rotor pole 28 moves into alignment with the stator pole 27, the force acting perpendicular to the direction of motion 30 becomes the dominant force, which reduces the net force 26.

FIG. 1C illustrates a single force 26 utilized in accordance with an embodiment of the invention. The single force 26 acts in the direction of the motion 34 when the coil 33 on the stator 31 is energized to magnetically attract the moving armature 32. Consequently, the produced force 26 is equal to the resultant or net force. Thus, the device of FIG. 1C produces a relatively large force since no perpendicular force is subtracted from the resultant force, as is the case in FIGS. 1A and 1B. This desirable property holds as long as the air gap remains relatively small.

Also observe that control is through a single linear direction of the air gap. That is, the stator 31 and moving armature 32 are aligned in a single linear direction (a vertical linear direction as shown in FIGS. 1C). This stands in contrast to the case of FIGS. 1A and 1B where there are two linear forces. For example, in FIG. 1A there is a vertical force, as shown with arrow 24, and a force with a horizontal component, as shown with arrow 25.

FIG. 2 shows an upper armature 2 with a central section 2A in contact with the North seeking pole of the permanent magnet 1 and four pole sections 4, 6, 8, and 10 that protrude from the central section 2A. Poles 4 and 8 define a first linear axis, while poles 6 and 10 define a second linear axis orthogonal to the first linear axis.

A lower armature 3 has a central section 3A in contact with the permanent magnet's 1 South seeking pole and four pole sections 5, 7, 9, and 11 that protrude from the central section 3A. The poles on the upper armature 2 are aligned with the poles on the lower armature 3 in the following manner: pole 4 is aligned with pole 5, pole 6 is aligned with pole 7, pole 8 is aligned with pole 9 and pole 10 is aligned with pole 11. Thus, there are aligned poles including first linear axis aligned poles (4, 8, 5, 9) and second linear axis aligned poles (6, 10, 7, 11).

A moving armature is placed adjacent to each of the aligned poles in the following manner: armature 13 is placed adjacent to poles 4 and 5, armature 14 is placed adjacent to poles 6 and 7, armature 15 is placed adjacent to poles 8 and 9, and armature 16 is placed adjacent to poles 10 and 11. The flux 16 produced by the permanent magnet 1 traverses into the central sections of the upper and lower armatures 2 and 3 and divides through the four paths formed by the four upper and lower stator poles through their respective armatures. Since the magnetic force of attraction for one magnetic pole is given by the flux density in the air gap squared times the pole area divided by 0.5 times 1 Tesla/$u_o$ and given that the flux from the permanent magnet is divided across four paths, then the force on any one of the armatures is 1/16 of the value it would be if it were only acting across one armature.

The field intensity it requires to produce 1 Tesla of magnetic flux density in the air gap is given by 1 Tesla/$u_o$ or 795,775 A/m. Therefore, to produce a flux density of 1 Tesla in the air gap between a stator pole and the armature where the air gap length is 0.0064 m or 0.25 inch, the required field intensity would be 5053 A/m. Since both the upper and lower stators have a pole facing into their respective armature, this results in two air gaps per armature. Therefore, the required field intensity would be 10,106 A/m to produce 1 Tesla in both of the air gaps. If the air gap were reduced to 0.000254 m [0.010 inch] the required field intensity to produce 1 Tesla in both gaps would be 404 A/m. Therefore, it could be stated that the reluctance in the air gap is reduced by 25 times.

In FIG. 3 if the air gap between armature 12 and the upper stator pole 10 and the lower stator pole 11 were reduced to zero meters, substantially all of the flux from the permanent magnet 1 would traverse through the upper and lower stator poles 10 and 11, respectively, and through armature 12. The force holding armature 12 to the stator poles increases by about 16 times the force it was experiencing when the air gap was 0.0064 meters and the magnetic force attracting the remaining armatures 13, 14 and 15 drops to essentially zero. Therefore, for a change in the air gap between any pair of stator poles and their respective armatures that share a single source of magnetic flux, in this case permanent magnet 1, the resulting forces on the remaining armatures divide or multiply accordingly.

In FIG. 4 if multiple magnets 35, 36 and 37 with their like magnetic poles aligned are added to the central sections of the upper stator 2 and the lower stator 3 no increase in available magnetic flux occurs since the central sections of the stators still realize the sum of the flux they produce. For all practical purposes they still behave as a single magnet or flux source which will still divide through the armatures 12, 13 and 14 accordingly. The permanent magnets 35, 36 and 37 in FIG. 4 are arced shaped magnets.

Figure 5:
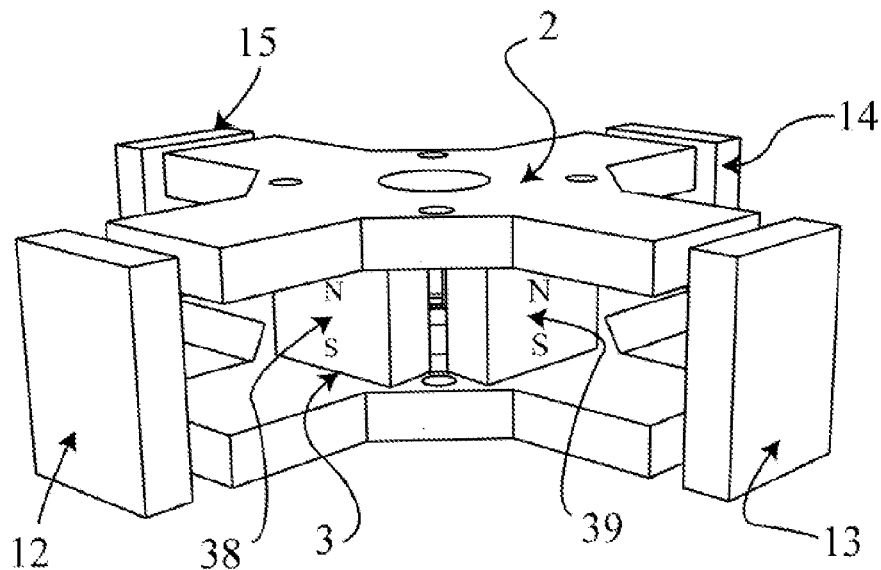

In FIG. 5 the permanent magnets 38 and 39 are rectangular in shape, but this does not alter the fact that all flux, whether a single permanent magnet or multiple permanent magnets is independent of shape and therefore will still behave as a single flux source. The flux from permanent magnets 38 and 39 will divide through the armatures 12, 13, 14, and 15 accordingly. The available flux is determined by the total area of the pole face(s) of a permanent magnet and the length between their poles, which produces the field intensity [A/m], which suggests that the greatest available flux will be produced by a single permanent magnet residing in the central portions of the upper stator 2 and lower stator 3, since it would have the greatest pole face area that would fit into these central stator portions.

Figure 6:
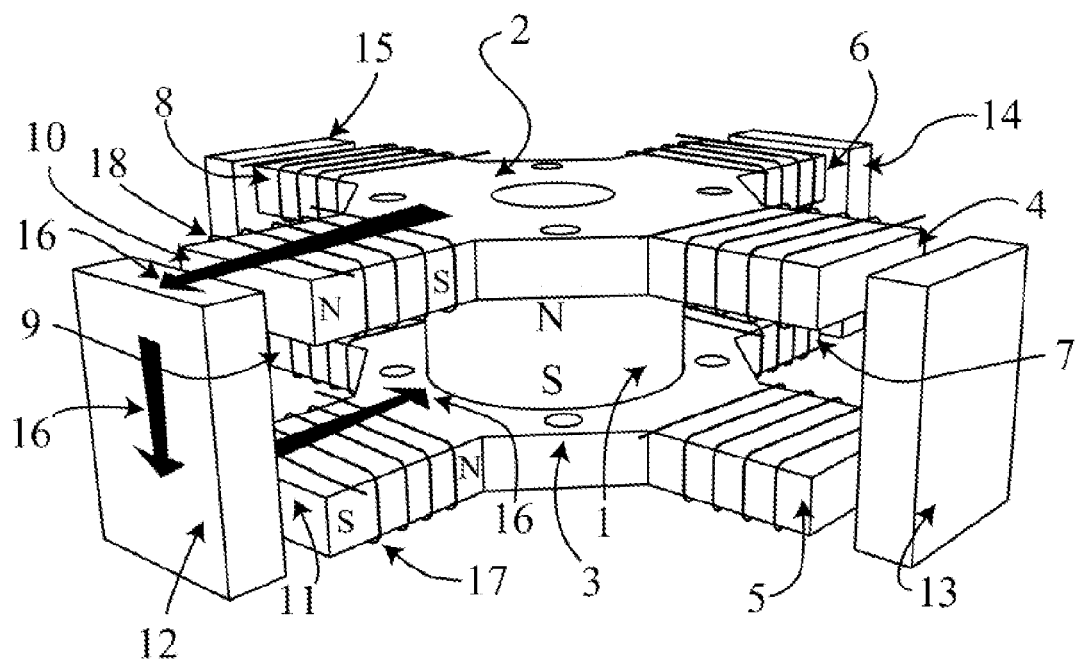
FIG. 6 shows how permanent magnets flux division/multiplication is affected by the current flowing in the coils located on the stator poles.

FIG. 6 shows control coils added to the poles 4, 6, 8, and 10 on the upper stator 2 and poles 5, 7, 9, and 11 on the lower stator 3. If a current is placed through the control coils 17 and 18, a magnetic polarity is produced, as shown on the upper stator pole 10 and on the lower stator pole 11 in FIG. 6. The magnetic polarity produced in the pole is opposite to that of the permanent magnet 1 contacting the central portion of that stator. The flux produced in the stator poles 10 and 11 due to the current flowing through the control coils 17 and 18 will couple with the flux of permanent magnet 1 and this combined flux will traverse through armature 12. Since the magnetic poles of the control coils 17 and 18 facing into the central portion of the upper and lower stators, respectively 2 and 3, only have a path through the permanent magnet 1 back to their magnetic poles facing toward and through armature 16, therefore if the flux produced by control coils 17 and 18 is greater than the portion of the permanent magnet flux already traversing through stator poles 11 and 10 a portion of the permanent magnet 1 flux traversing through stator poles 5, 6, 7, 8, and 9 and their respective armatures 13, 14, and 15 will be diverted or redirected through the stator poles 10 and 11 and its respective armature 12 until the amount of this redirected flux equals the flux produced by the control coils 17 and 18. As the current is increased through the control coils 17 and 18, the flux 16 traversing through the stator poles 10 and 11 and through armature 12 increases and the flux traversing the remaining stator poles and their respective armatures decreases, which results in a stronger attracting force on armature 12 and a weaker force on the remaining stator poles and their respective armatures. If the current is increased in the control coils 17 and 18 to where the flux produced in the stator poles 10 and 11 and through armature 12 equals the entire flux produced by the permanent magnet 1 all of the flux 16 from permanent magnet 1 will traverse through the stator poles 10 and 11 and armature 12, but in this case will increase the force on armature 12 to a value much greater than 16 times, as discussed in connection with FIG. 3. This is due to the fact that the field intensity of the control coil adds to the field intensity of the permanent magnet, which will increase the flux density in the air gap between armature 12 and stator poles 10 and 11.

FIGS. 3 and 6 demonstrate that the resultant force on any on the armatures 12, 13, 14, and 15 is controlled by both the length of their individual air gaps between the armatures 12, 13, 14, and 15 and their respective stator poles 4, 5, 6, 7, 8, 9, 10, and 11 and the current flowing through the control coils wound on all of the stator poles. By controlling the current through various control coils the forces on all of the armatures can be kept balanced or can be increased or decreased independent of air gap length.

Figure 7:
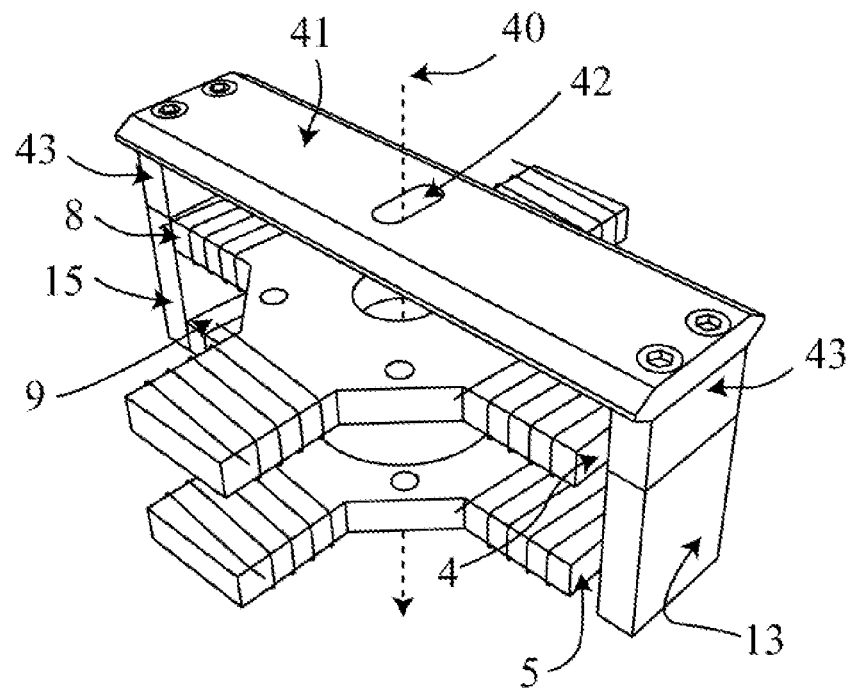
FIG. 7 shows a first set of slotted sliding members attached to armatures that are opposite each other or displaced by 180 degrees to form a first linear actuator located about a central axis.

FIG. 7 shows the formation of a first linear actuator by attaching one end of a slotted slider 41 and a nonmagnetic spacer 43 to armature 13 and the opposite end of the slotted slider 41 and a nonmagnetic spacer 43 to armature 15. Armatures 13 and 15 remain in alignment with their associated stator poles 4, 5, 8, and 9 but armatures 13 and 15 must move in unison with one another or as the air gap between one pair of stator poles and its associated armature increases the air gap between the opposite pair of stator poles and its associated armature must decrease and vice versa.

Figure 8:
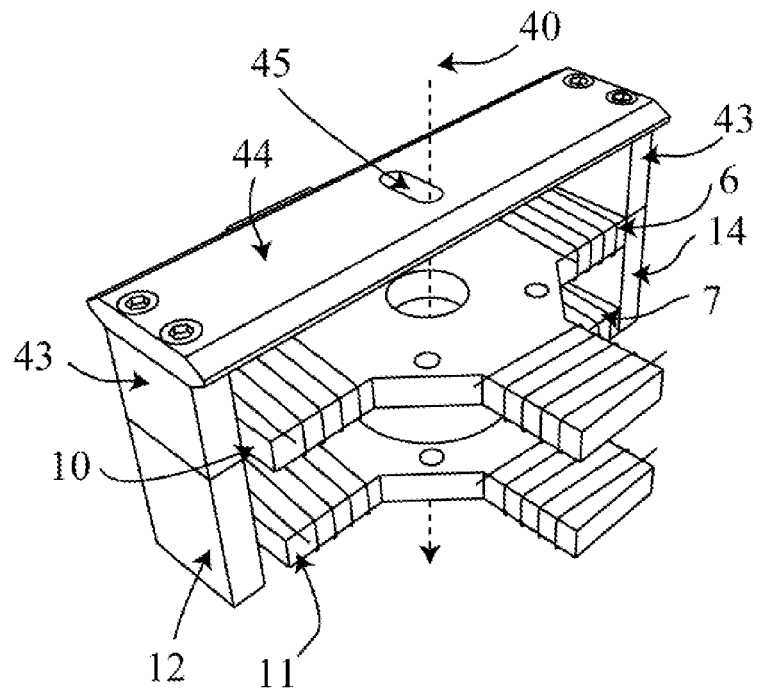
FIG. 8 shows a second set of slotted sliding members attached to armatures that are opposite each other or displaced by 180 degrees but offset by 90 degrees to form a second linear actuator located about a central axis.

FIG. 8 shows the formation of a second linear actuator by attaching one end of a slotted slider 44 and a nonmagnetic spacer 43 to armature 12 and the opposite end of the slotted slider 41 and a nonmagnetic spacer 43 to armature 14. Armatures 12 and 14 remain in alignment with their associated stator poles 6, 7, 10, and 11 but armatures 12 and 14 must move in unison with one another or as the air gap between one pair of stator poles and its associated armature increases the air gap between the opposite pair of stator poles and its associated armature must decrease and vice versa.

Figure 9:
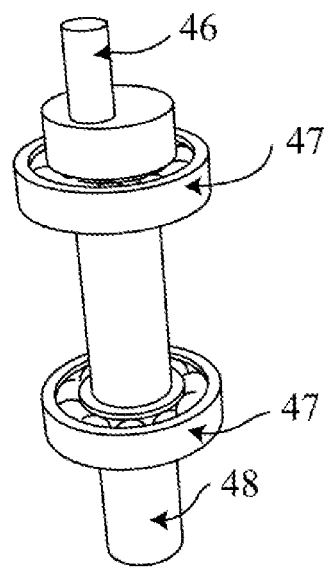
FIG. 9 shows a crank arm attached to an output shaft with bearings fixed for rotation.

FIG. 9 shows a crank arm 46 attached to an output shaft 48 with bearings 47 mounted on the output shaft 48 to allow rotation of both the crank arm 46 and output shaft 48. This crank arm and shaft act as motion translator between the two linear actuators described in FIGS. 7 and 8 from linear motion to rotary motion. It should be noted that other means for the translation from linear motion to rotary motion exist and this method is shown as one example and where the motion translation means is not pertinent to the invention disclosed herein.

Figure 10:
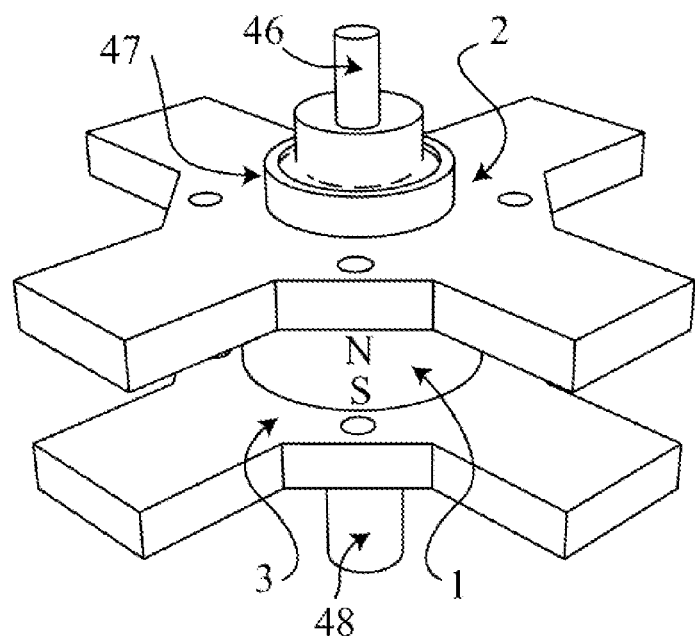
FIG. 10 shows the crank arm and output shaft placed into the actuator's stator portions.

FIG. 10 shows the crank arm 46, bearings 47, and output shaft 48 inserted into the stator assembly comprised of the upper stator 2 and lower stator 3 and permanent magnet 1 allowing the crank arm to rotate in the central axis of the stator assembly.

Figure 11:
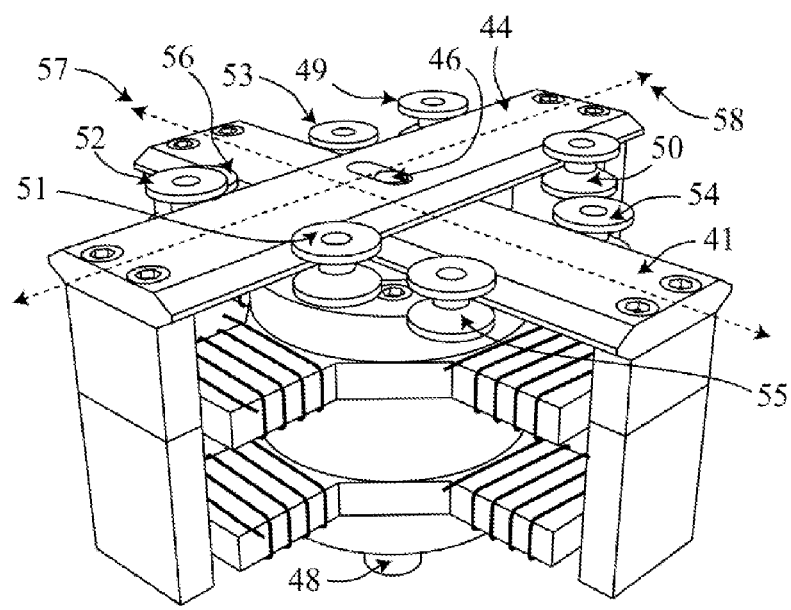
FIG. 11 shows the guide bearings that restrict the slotted sliders attached to the armatures to produce only linear motion along an axis.

FIG. 11 shows guide bearings 52 and 55 placed adjacent to one side of the slotted slider 41 and guide bearings 53 and 54 placed adjacent to the opposite side of the slotted slider 41 where these guide bearings constrain the slotted slider 41 to move along the axis 57. FIG. 11 also shows guide bearings 50 and 51 placed adjacent to one side of the slotted slider 44 and guide bearings 49 and 52 placed adjacent to the opposite side of the slotted slider 44 where these guide bearings constrain the slotted slider 44 to move along the axis 58. The slots in the slotted sliders 41 and 44 are placed over the crank arm 46, which maintains a specific relationship between the linear position between the slotted sliders 41 and 44 and the angular position of the crank arm 46.

Figure 12:
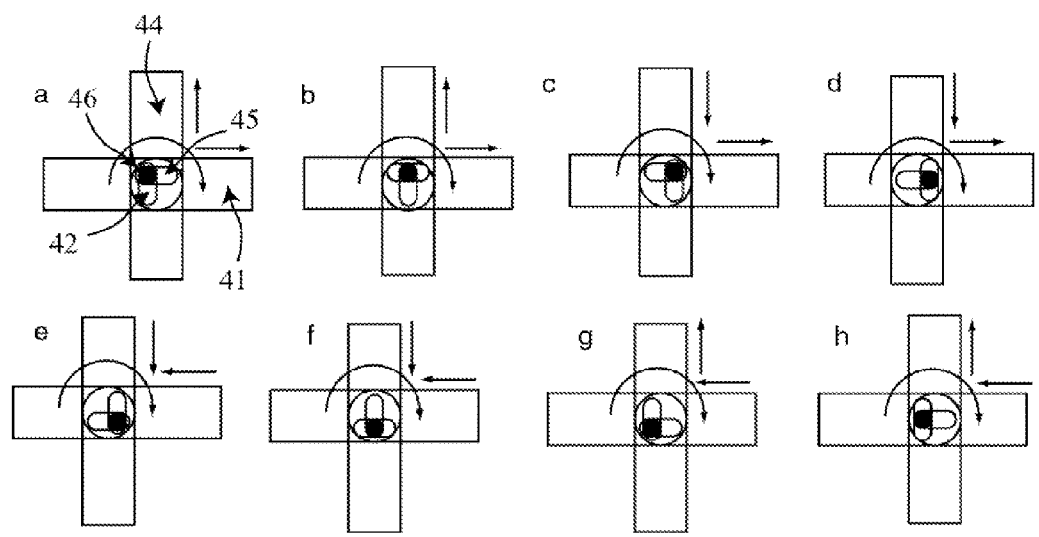
FIG. 12 shows a sequence of motion for slotted sliders to interact with the crank arm to translate linear motion into rotary motion.

This linear to angular relationship between the slotted sliders 41 and 44 and the crank arm 46 is shown in FIG. 12. If the control coils are sequentially energized in an ordered manner, the slots in each of the slotted sliders will impart a continuous rotary motion and a high force to the output shaft 48. FIG. 12 illustrates a sequence of clock-wise linear transpositions beginning at (a) and ending at (h), which produces rotary motion. Motion from (a) to (c) is linear in a first horizontal direction, while motion from (c) to (e) is linear in a first vertical direction, orthogonal to the first horizontal direction. Motion from (e) to (g) is linear in a second horizontal direction opposite the motion of (a) through (c). Motion from (g) to (h) is linear in a second vertical direction opposite the motion from (c) through (e).

If a rotating mechanical input power is applied to the output shaft 48 the crank shaft will move the slotted sliders and their attached armatures in a manner to create a flux swing through each of the control coils generating electrical energy. Since this novel actuator is also capable of acting as a generator it lends itself well to four quadrant control where coasting could generate electrical power that can be shunted for braking or to recharge batteries.

Figure 13:
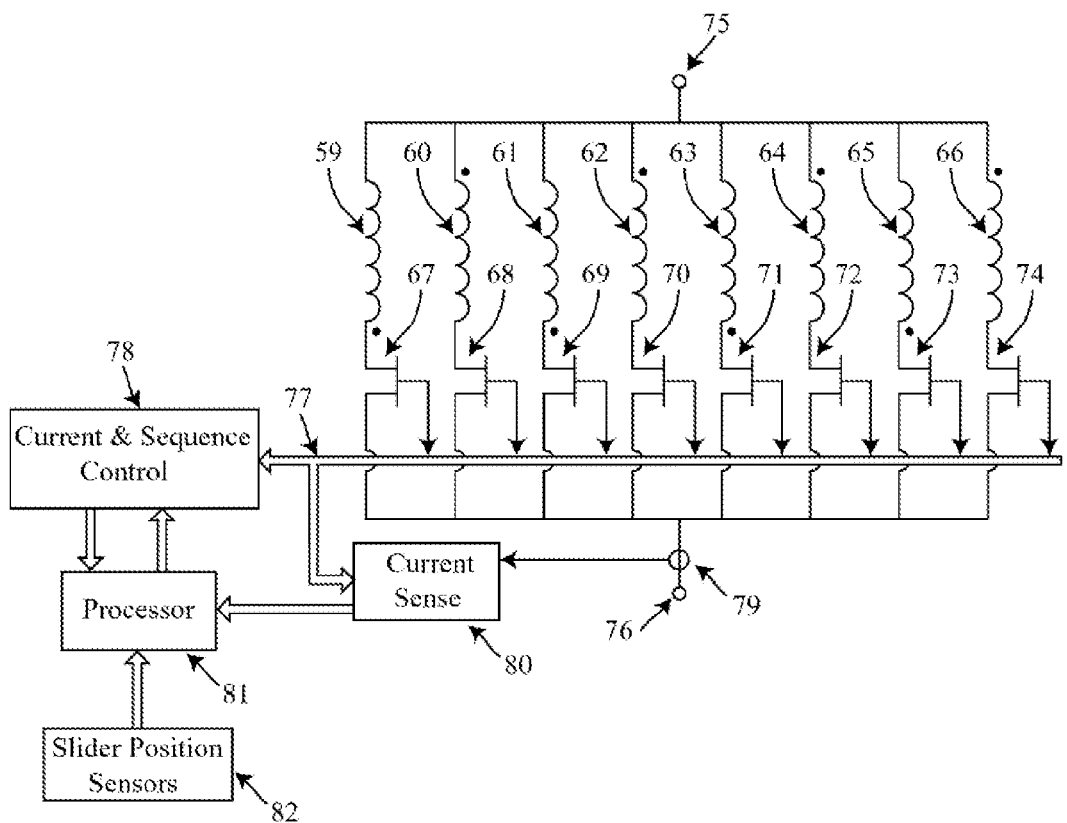
FIG. 13 illustrates an exemplary control mechanism that may be used in accordance with an embodiment of the invention.

The control coils are sequentially energized by a controller. FIG. 13 illustrates a controller that may be used in accordance with an embodiment of the invention. The controller sequentially energizes the control coils 59 through 66 in an ordered manner through the firing of the power switches 67 through 74. The power switches are connected to bus 77, which has a current and sequence controller 78 governed by a processor 81. Processor 81 additionally acquires information from a current sensor 79 and 80 and slotted slider position sensors 82.

Figure 14:
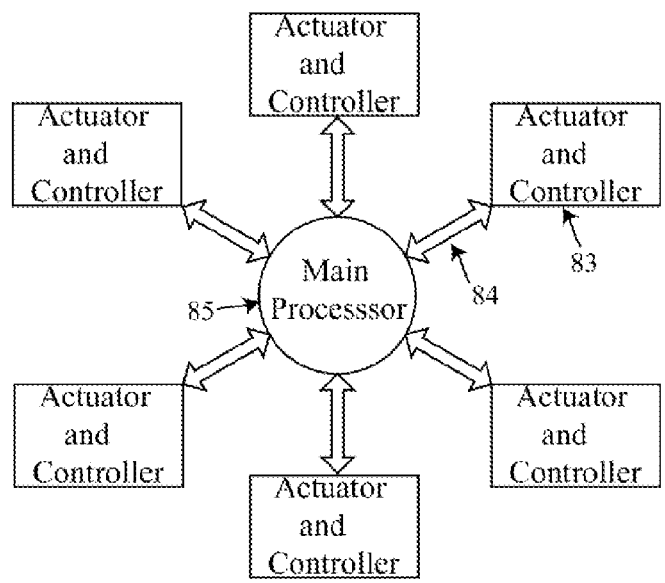
FIG. 14 shows multiple actuators integrated into a system being controlled by a main processor.

FIG. 14 shows a polarity of the new high force actuators 83 integrated into a system requiring several actuators under the control of a main processor 85. The main processor 85 communications with actuator and controllers 83 via a bus 84.

Thus, the invention includes one or more linear actuators placed around a central axis. Output forces of the linear actuators are summed and translated to rotary motion, but an individual linear actuator only produces force along its axis of motion. Therefore, the sum of all of the forces produced by the one or more linear actuators appears at the output of the actuator.

The mechanism of the invention creates high linear forces over short distances. Advantageously, the sum of a set of linear forces is translated to rotary motion, resulting in high forces with high response times. This is accomplished without hydraulics or a transmission structure. Thus, the invention may be implemented as a light weight high power density actuator. The actuator is controlled with permanent magnet flux division and multiplication modes.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method comprising:
   in an actuator comprising:
      coils wrapped around a first plurality of poles defining a first linear axis of a first stator and a second linear axis of the first stator orthogonal to the first linear axis;
      coils wrapped around a second plurality of poles of a second stator, the second plurality of poles forming aligned poles with the first plurality of poles including first linear axis aligned poles and second linear axis aligned poles;
      a permanent magnet between the first stator and the second stator; and
      a plurality of moving armatures separated from the aligned poles by a corresponding plurality of air gaps;
   selectively applying current to the coils to control a size of a first air gap between a first moving armature and a first end of the first linear axis aligned poles to form a first linear motion and control a second size of a second air gap between a second moving armature and a first end of the second linear axis aligned poles to form a second linear motion; and
   receiving output forces of the first linear motion and the second linear motion at a shaft and translating the output forces to rotary motion of the shaft.

2. The method of claim 1 further comprising applying current to the coils by a controller to decrease an air gap between a controlled moving armature and controlled aligned poles to produce a divided force between remaining moving armatures and remaining aligned poles.

3. The method of claim 1 further comprising applying current to the coils by a controller to increase an air gap between a controlled moving armature and controlled aligned poles to produce a multiplied force between remaining moving armatures and remaining aligned poles.

4. The method of claim 1 further comprising receiving the first linear motion at a first slotted slider positioned along the first linear axis and receiving the second linear motion at a second slotted slider positioned along the second linear axis to manipulate a crank arm of the actuator.

5. The method of claim 1 further comprising sequentially applying current to the coils in an ordered manner to impart a continuous rotary motion on the shaft.

6. The method of claim 1 further comprising sequentially applying current to the coils in a clockwise manner to impart a continuous rotary motion on the shaft.

7. A method, comprising:
   in an actuator comprising:
      coils wrapped around four first poles of a first stator and four second poles of a second stator aligned with the four first poles;
      a permanent magnet between the first stator and the second stator; and
      four moving armatures positioned at terminal ends of the four first poles and the four second poles;
   selectively applying current to the coils to migrate flux created by the permanent magnet through selective poles of the first stator and the second stator to selectively alter gap sizes associated with the four moving armatures.

8. The method of claim 7 further comprising dividing the flux between the selective poles and remaining poles.

9. The method of claim 7 further comprising multiplying the flux between the selective poles and remaining poles.

10. The method of claim 7 further comprising applying current to the coils to move each moving armature of the four moving armatures in a respective single linear direction.

11. The method of claim 7 further comprising translating linear forces created by the moving armatures at a shaft to a rotary force.

12. The method of claim 7 further comprising engaging a crank arm by a first slotted slider and a second slotted slider.

13. The method of claim 7 further comprising sequentially applying current to the coils in an ordered manner to impart a continuous rotary motion on the shaft.

14. The method of claim 7 further comprising sequentially applying current to the coils in a clockwise manner to impart a continuous rotary motion on the shaft.

15. A method comprising:
selectively applying current to (i) first coils wrapped around a first plurality of poles defining a first linear axis of a first stator and a second linear axis of the first stator orthogonal to the first linear axis and (ii) second coils wrapped around a second plurality of poles of a second stator, the second plurality of poles forming aligned poles with the first plurality of poles including first linear axis aligned poles and second linear axis aligned poles to:
control a size of a first air gap between a first moving armature and a first end of the first linear axis aligned poles to form a first linear motion; and
control a second size of a second air gap between a second moving armature and a first end of the second linear axis aligned poles to form a second linear motion; and
receiving output forces of the first linear motion and the second linear motion at a shaft and translating the output forces to rotary motion of the shaft.

16. A method, comprising:
selectively applying current to coils wrapped around four first poles of a first stator and four second poles of a second stator aligned with the four first poles to migrate flux created by a permanent magnet through selective poles of the first stator and the second stator to selectively alter gap sizes associated with four moving armatures positioned at terminal ends of the four first poles and the four second poles.

* * * * *